US008234330B2

(12) United States Patent
Hall

(10) Patent No.: US 8,234,330 B2
(45) Date of Patent: Jul. 31, 2012

(54) PROGRAMMATICALLY MANAGING CONNECTIONS BETWEEN SERVERS AND CLIENTS

(75) Inventor: Peter J. Hall, Ringwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 11/465,949

(22) Filed: Aug. 21, 2006

(65) Prior Publication Data

US 2008/0046551 A1    Feb. 21, 2008

(51) Int. Cl.
    *G06F 15/16*  (2006.01)
(52) U.S. Cl. .................. 709/203; 709/220; 709/223
(58) Field of Classification Search .................. 709/203
    See application file for complete search history.

(56) References Cited

U.S. PATENT DOCUMENTS

| | | | | |
|---|---|---|---|---|
| 5,559,958 | A * | 9/1996 | Farrand et al. .................. | 714/27 |
| 6,167,255 | A | 12/2000 | Kennedy, III et al. | |
| 6,334,615 | B1 * | 1/2002 | Uchiyama et al. ............ | 277/376 |
| 6,353,446 | B1 | 3/2002 | Vaughn et al. | |
| 6,363,421 | B2 * | 3/2002 | Barker et al. .................. | 709/223 |
| 6,389,464 | B1 * | 5/2002 | Krishnamurthy et al. .... | 709/220 |
| 6,816,897 | B2 * | 11/2004 | McGuire ........................ | 709/223 |
| 6,957,263 | B2 | 10/2005 | Galou et al. | |
| 6,996,778 | B2 * | 2/2006 | Rajarajan et al. ............. | 715/734 |
| 7,007,092 | B2 | 2/2006 | Peiffer | |
| 7,031,999 | B1 | 4/2006 | Ludwig et al. | |
| 7,140,014 | B2 * | 11/2006 | Coryell et al. ................ | 717/176 |
| 7,340,446 | B2 * | 3/2008 | Rajarajan et al. ..................... | 1/1 |
| 7,444,633 | B2 * | 10/2008 | Bohn et al. ..................... | 718/100 |
| 7,493,379 | B2 * | 2/2009 | Takizawa et al. ............. | 709/223 |
| 2001/0052006 | A1 * | 12/2001 | Barker et al. .................. | 709/223 |
| 2002/0042828 | A1 | 4/2002 | Peiffer | |
| 2002/0143949 | A1 * | 10/2002 | Rajarajan et al. ............. | 709/226 |
| 2003/0046398 | A1 * | 3/2003 | Buckley et al. ............... | 709/227 |
| 2004/0098474 | A1 * | 5/2004 | Galou et al. ................... | 709/223 |
| 2005/0102683 | A1 * | 5/2005 | Branson et al. ............... | 719/328 |
| 2005/0267963 | A1 * | 12/2005 | Baba et al. ..................... | 709/223 |
| 2006/0089996 | A1 | 4/2006 | Peiffer | |
| 2007/0136467 | A1 * | 6/2007 | Masci et al. ................... | 709/225 |
| 2007/0143465 | A1 * | 6/2007 | Gonzalez et al. ............. | 709/223 |

OTHER PUBLICATIONS

Systems Management, "Maintaining Network Uptime Using Serial Console Port Management", pp. 1-4, Dell Power Solutions, Jun. 2004.

* cited by examiner

*Primary Examiner* — Firmin Backer
*Assistant Examiner* — Natisha Cox
(74) *Attorney, Agent, or Firm* — Hoffman Warnick LLC; William E. Schiesser

(57) ABSTRACT

The present invention generally provides for the programmatic management of connections between servers (e.g., open system servers) and clients (local and/or remote). Specifically, under the present invention, a management console is provided through which connections between the servers and clients are established, maintained and/or terminated. Software loaded on the management console will provide a client menu for connections between servers and clients and an administrative menu for managing configurations of the servers on a management console through which the connections are established. Based on selections made using the client menu and the administrative menu, the connections and the configurations will be programmatically managed.

24 Claims, 2 Drawing Sheets

PROGRAMMATICALLY MANAGING CONNECTIONS BETWEEN SERVERS AND CLIENTS

FIELD OF THE INVENTION

The present invention generally relates to the management of client-server connections and configurations. Specifically, the present invention provides a way to centrally and programmatically manage the connections and configurations.

BACKGROUND OF THE INVENTION

In many companies/divisions, service delivery personnel often require a simple, reliable, and scaleable method for providing customers with open system console connectivity during their disaster recovery tests or declared events. Moreover, customers need a simple, reliable, and easy to use interface to access their open system server consoles regardless of the location of either servers or customer/end-user. The technical staff is then challenged to deliver customer test and declaration environments, including console connectivity, rapidly, with fewer resources, and at a minimal cost.

Existing console solutions in the marketplace today do not provide the level of flexibility, portability, and transparency suitable for the needs of most businesses. Additionally, these solutions/products are typically cumbersome to administer and do not provide a simple and easy to use interface required for the customer to gain access to their contracted server consoles. That is, they require manual efforts (e.g., manually changing code) to manage such connections.

In view of the foregoing, there exists a need for a solution that solves at least one of the deficiencies in the related art.

SUMMARY OF THE INVENTION

The present invention generally provides for the programmatic management of connections between servers (e.g., open system servers) and clients (local and/or remote). Specifically, under the present invention, a management console (e.g., also referred to as a Universal Serial Console Server (USCS)) is provided through which connections between the servers and clients are established, maintained and/or terminated. The management console is typically is a collection of software operating on a server (e.g., AIX/UNIX server) that manages a directly attached Serial and Local Area Network (LAN) infrastructure. UNIX and UNIX-based terms are trademarks of The Open Group in the United States, foreign countries, or both. AIX and AIX-based terms are trademarks of International Business Machines Corp. in the United States, foreign countries, or both. The software in conjunction with the managed infrastructure has been designed as a highly configurable medium for establishing and managing connectivity of open system servers (consoles) or any serial-based console interface to end-users. Server connectivity can be quickly configured and established for any managed server console port to any end-user.

The end-user can have access to the allocated server consoles via local ASCII terminals, local workstations, or remote workstations. Server access through a workstation provides the ability to access multiple server consoles simultaneously via a simple point and click browser or text menu interface. This connectivity can be configured and established regardless of the location of either server or end-user provided network connectivity could be established between the two locations.

Allocations, whether local or remote, are configured though an easy to use administrative menu system. All aspects of managing the console are done via this administrative menu system, which eliminates the need for manually editing configuration files as required by previous solutions. Additionally, read-only console sessions can be established for any active console session. Session logs are also maintained and viewable by the console administrator via the administrative menu system.

Both the console allocation configuration and the end-user console access are designed for simplicity, transparency, and security. Along these lines, both administrator and end-user interfaces are intuitive and require no extensive technical expertise or training. These traits make it highly suitable for businesses by their simplification of console setup, and by eliminating costs associated with proprietary client code and server licensing.

The server-side console port infrastructure supports multiple mediums including standard serial, Internet Protocol (IP), or both, (as illustrated below) with no requirements for proprietary cabling. This means that other vendors' serial over IP solutions can be integrated into and managed with the console. Furthermore, a secondary server can be incorporated into the console environment to provide redundancy and fail over capabilities.

A first aspect of the present invention provides a programmatic management system, comprising: a client menu system for providing a client menu for managing connections between servers and clients; an administrative menu system for providing an administrative menu for managing configurations of the servers on a management console through which the connections are established; and a management system for programmatically managing the connections and the configurations based on selections made using the client menu and the administrative menu.

A second aspect of the present invention provides a programmatic management method, comprising: providing a client menu for managing connections between servers and clients; providing an administrative menu for managing configurations of the servers on a management console through which the connections are established; and programmatically managing the connections and the configurations based on selections made using the client menu and the administrative menu.

A third aspect of the present invention provides a method for programmatically managing connections between clients and servers, comprising: providing a client menu comprising a list of possible client selections to the clients from a management console through which the connections are established; receiving a client selection made from the list of possible client selections on the management console from one of the clients; and programmatically managing a connection between the client and one of the servers based on the client selection.

A fourth aspect of the present invention provides a program product stored on a computer readable medium for programmatically managing connections between servers and clients, the computer readable medium comprising program code for causing a computer system to perform the following: provide a client menu for managing the connections to the clients; provide an administrative menu for managing configurations of the servers on a management console through which the connections are established; and programmatically manage the connections and the configurations based on selections made using the client menu and the administrative menu.

A fifth aspect of the present invention provides a method for deploying a system for programmatically managing connections between servers and clients, comprising: providing a computer infrastructure being operable to: provide a client menu for managing the connections to the clients; provide an administrative menu for managing configurations of the servers on a management console through which the connections are established; and programmatically manage the connections and the configurations based on selections made using the client menu and the administrative menu.

A sixth aspect of the present invention provides computer software embodied in a propagated signal for programmatically managing connections between servers and clients, the computer software comprising instructions for causing a computer system to perform the following: provide a client menu for managing the connections to the clients; provide an administrative menu for managing configurations of the servers on a management console through which the connections are established; and programmatically manage the connections and the configurations based on selections made using the client menu and the administrative menu.

A seventh aspect of the present invention provides a business method for programmatically managing connections between servers and clients.

BRIEF DESCRIPTION OF THE DRAWINGS

These and other features of this invention will be more readily understood from the following detailed description of the various aspects of the invention taken in conjunction with the accompanying drawings in which.

Figure 1:
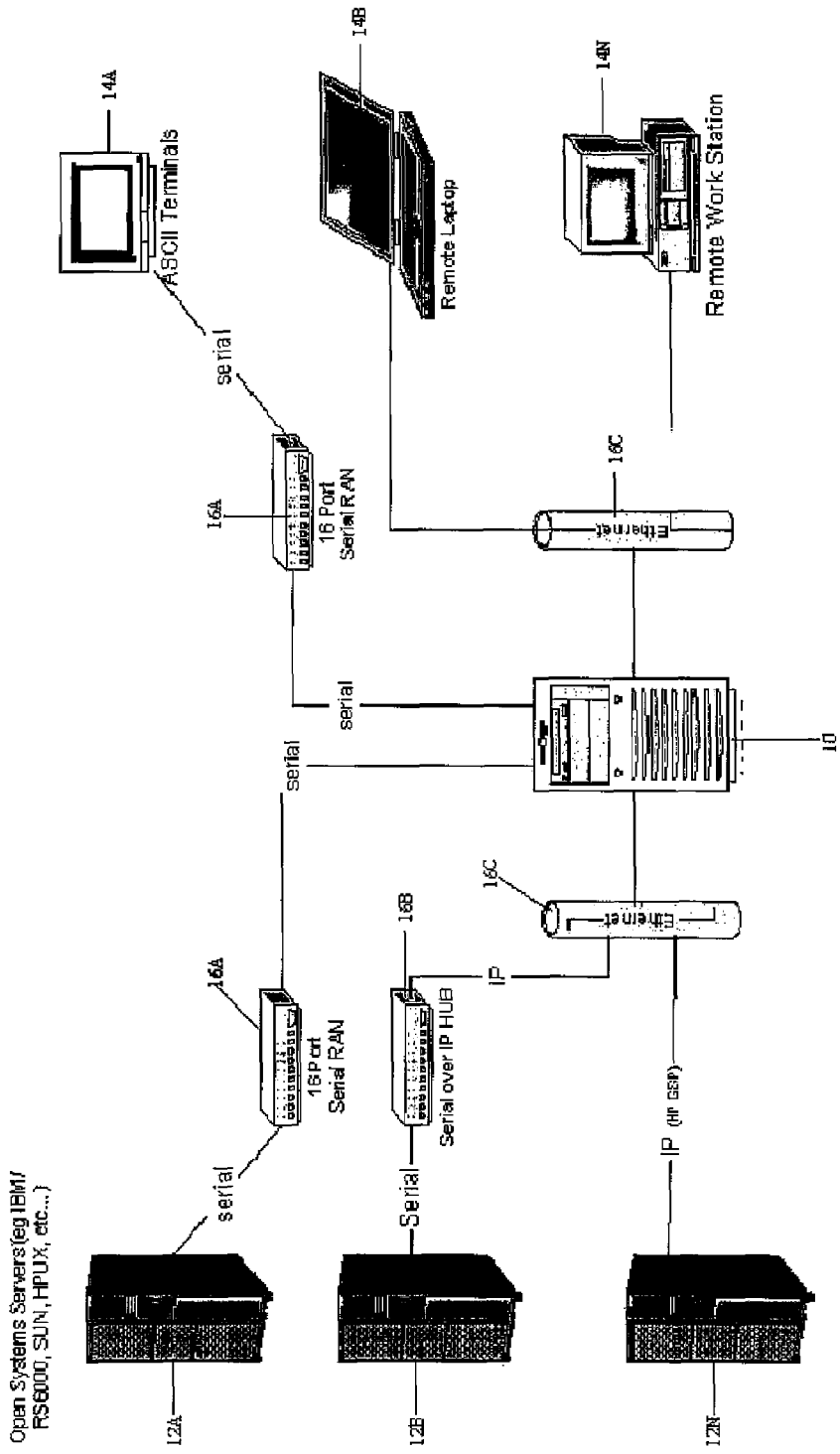
FIG. 1 depicts a diagram of a physical layout including a management console according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
 I. General Description
 II. Physical Layout
 II. Computerized Implementation
I. General Description The present invention generally provides for the programmatic management of connections between servers (e.g., open system servers) and clients (local and/or remote). Specifically, under the present invention, a management console (e.g., also referred to as a Universal Serial Console Server (USCS)) is provided through which connections between the servers and clients are established, maintained and/or terminated. The management console is typically is a collection of software operating on a server (e.g., AIX/UNIX server) that manages a directly attached Serial and LAN infrastructure. The software in conjunction with the managed infrastructure has been designed as a highly configurable medium for establishing and managing connectivity of open systems servers (consoles) or any serial-based console interface to end-users. Server connectivity can be quickly configured and established for any managed server console port to any end-user.

The end-user can have access to the allocated server consoles via local ASCII terminals, local workstations, or remote workstations. Server access through a workstation provides the ability to access multiple server consoles simultaneously via a simple point and click browser or text menu interface. This connectivity can be configured and established regardless of the location of either server or end-user provided network connectivity could be established between the two locations.

Allocations, whether local or remote, are configured though an easy to use administrative menu system. All aspects of managing the console are done via the administrative menu system, which eliminates the need for manually editing configuration files as required by previous solutions. Additionally, read-only console sessions can be established for any active console session. Session logs are also maintained and viewable by the console administrator via the administrative menu system.

Both the console allocation configuration and the end-user console access are designed for simplicity, transparency, and security. Along these lines, both administrator and end-user interfaces are intuitive and require no extensive technical expertise or training. These traits make it highly suitable for businesses by their simplification of console setup, and by eliminating costs associated with proprietary client code and server licensing.

The server-side console port infrastructure supports multiple mediums including standard serial, IP, or both, (as illustrated below) with no requirements for proprietary cabling. This means that other vendors' serial over IP solutions can be integrated into and managed with the console. Furthermore, a secondary server can be incorporated into the console environment to provide redundancy and fail over capabilities.

II. Physical Layout

Referring now to FIG. 1, a basic physical layout of the management console 10 (including serial and Ethernet infrastructures) according to the present invention is shown. In general, management console 10 is a centrally located server (e.g., a AIX/UNIX server) that hosts the software that manages the environment and Server 12A-N console configurations according to the present invention. Management console 10 is equipped with multiple serial and IP interfaces. The server side serial/IP infrastructure is a static isolated network environment and is only accessible via management console 10. The serial/IP connections 16A-C to servers 12A-N are connected to managed server console ports. The server console ports are then directed to the appropriate end-user device(s)/clients 14A-N via the allocation configuration programs within an administrative menu system of the software contained on management console 10.

Management console 10's software is typically comprised of executable program files, configuration files, and hypertext markup language (HTML) code. These components are laid out in a common UNIX file system structure on management console 10. Console allocations and connections are managed by the programmatic manipulation of files such as configuration files. These configuration files are maintained and manipulated by an intuitive administrative menu system. The administrative menu system interface empowers a console administrator (not shown) with the ability to mange server console allocations for both local (e.g., ASCII) clients 14A and remote clients 14B-N. Configuration for remote clients 14B-N includes the automated configuration of network interfaces and user accounts on management console 10.

Console allocations to local client 14A look and feel as if they were directly connected to the servers console port. An end-user will have no indication whatsoever that it is anything else other than a direct serial connection. No other known product or solution provides such transparency. Servers 12A-N allocated to remote clients 14B-N over IP are accessible though a "point and click" web browser interface or a text menu via a telnet or SSH session. Either method allows access to only the server(s) 12A-N allocated to the given end-user. The end-user selects an allocated console from a drop down list via the WEB browser interface or from a text menu during a telnet or SSH session. Again, no other product or solution has been seen that will provide console access in this manner.

Console allocations to remote clients 14B-N are based on either remote clients 14B-N IP, the network interface on management console 10 for which the workstation is communicating to, or by user name. When a browser is not available, a simple text menu is used via telnet or SSH. In such cases, the end-user is provided with a login id that is automatically generated at allocation configuration time via the administrative menu system. Once logged in via telnet or SSH the end-user is presented with the simple text menu providing the same functionality as the browser interface. Console allocations that are configured for a remote client 14B-N incorporate a dedicated NIC on management console 10 allocated for that client's sole use, thus, enhancing the security aspects of management console 10.

The Software:

Management console 10's software is typically comprised of executable program files, configuration files, and HTML code. These components are laid out in a common UNIX file system structure. The functional aspects of these files are as shown below. The HTML/CGI, not listed below, is coded to be a point and click interface to management console 10. Upon making the desired selection(s), the CGI will execute a call to the "csadm" or "usershell" programs with the appropriate command line options.

The Program Files:

(1) /usr/trmsrv/bin/csadm

This is the main configuration menu program used by management console 10's administrator. Within its menus, the administrator can connect to server consoles, allocate server consoles, monitor active server console sessions, close and or remove console allocations. This program reads from and writes to the configuration files.

(2) /usr/trmsrv/bin/usershell

This is the main console interface program used by remote end-users. When remote users connect via telnet or SSH they are forced into this menu program. Upon menu selection, allocations are presented to the end-user based upon their login id. When a remote end-user connects via the WEB interface the program is used with command line options by the HTML/CGI code for the desired function (i.e. console list, connect, disconnect, or monitor).

(3) /usr/trmsrv/bin/tscon

This is the console connect script, and is called by the above menu programs. It is also run via management console 10's "getty" process for ASCII terminal directly connected to a TTY on management console 10. When ASCII terminals are powered on the "tscon" program is run via the "getty" and reads the main configuration file to determine what console if any is to be connected. When a console allocation is configured for the given end device, a Kermit program is then called to facilitate the communications link to the desired console port.

The Configuration Files:

(1) /usr/trmsrv/cfg/trmsrv.cfg

This is the main configuration file for the program set. It contains references to all current console allocations. This file is written and maintained by the allocation configuration program and read by the console connect program. Below are some sample entries. Each line represents a console allocation with colon-delimited fields:

ServerTTY/IP, Port:ServerHostname:SuiteTTY:Suite:Position:TestEndTime
tty27:B80D:tty100:H:4:2005:05:18:08:00:
10.10.13.3,23:RP2470C:tty174:D:14:2005:05:18:08:00:
tty13:6M1E:USER1:R:0:2005:08:25:00:01:
VAATHMR038:RS The first line shows an allocation using an all "serial network" (see above diagram). It indicates the console for server "B80D" which is directly connected to management console 10 on "tty27" is allocated to an ASCII terminal in a customer suite (Suite H position #4) that is connected to management console 10 on "tty100". The later fields indicate the date and time the customer test ends. This information entered at allocation time prevents the allocation from being inadvertently removed prior to the customers test completion.

The second entry shows an allocation using both IP and serial networks. The server console port is connected to the console server via an IP network (HP GSP port). The customer or end-user interface is connected to management console 10 via a serial network as described in the previous example.

The third entry shows an allocation for a remote end-user (USER1).

(2) /usr/trmsrv/cfg/srvtty.1st

This file contains a listing of all servers indicating the server name, type, status, and their respective console port device connection to management console 10 (e.g., tty/serial or IP). This file is read and written to by the allocation and connect program. The only changes made to this file by the allocation program are to the status fields. The status field will indicate the following:

Inuse: This tells the configuration manager that this server console is currently being used and is not available for allocation.

Alloc: This tells the configuration program that this server console is currently allocated to a remote end-user and is not available for allocation. When a remote end-user connects to this console, the status is then changed to Inuse.

Avail: This indicates that this server console is available for allocation. Below are a few sample lines including the header:

ServerTTY/IP, port:ServerName:Status:ServerType
tty23:B80A:inuse:RS
10.100.3.5,3002:E450A:avail:SUN
10.10.110.1,23:L2000A:alloc:HP The fist entry shows the RS6000 server B80D is connected to management console 10 serially via tty23 and is currently in use.

The second line shows that SUN server E450A is connected to management console 10 via a serial over IP device (i.e. IP Address, Port #) and is available for allocation. (Sun and Sun-based terms are trademarks of Sun Microsystems, Inc. in the United States, foreign countries, or both.)

The third line shows that HP server L200A is connected to management console 10 via an IP connection to that servers GSP port and is currently allocated for remote end-user. (HP and HP-based terms are trademarks of Hewlett-Packard, Inc. in the United States, foreign countries, or both.)

(3) /usr/trmsrv/cfg/montty.1st

This file contains a listing of all serially connected ASCII terminals. These terminals are typically located in a customer suite. This file is read and written to by the allocation configuration program. Typically, the only changes made to this file by the allocation program are to the status fields. The entry below shows that the ASCII monitor in customer suite H position 2 is connected to management console 10 on "tty98" and is available for allocation:

MonitorTTY:Suite:status:SuitePosition
   tty98:H:avail:2:

(4) /usr/trmsrv/cfg/userether.cfg

This configuration file contains a listing of all network interfaces on management console 10 used for remote customer connectivity. NICs are allocated to remote customers on a one to one ration.

Interface:PatchPort:Status:User:IP:Mask:Gateway
   en4:22933:inuse:USER1:162.95.66.13:255.255.255.0: 162.95.66.1
   en5:22934:inuse:USER2:166.31.11.16:255.255.255.0:
   en6:22932:avail
   en7:22931:avail The first line indicates the network interface labeled "en4" is currently in use and allocated to the end-user named "USER1". The "en4" interface is configured with an IP address, netmask, and gateway as indicated by the remaining entries in the line. This IP scheme is specified by the customer or end-user. Interfaces "en6" and "en7" are available for configuring.

The second field of each line contains the physical network patch port number for the given interface. These numbers are displayed to the console administrator upon configuration of a remote user for console access. That number is then documented and forwarded to a network administrator for inclusion in the appropriate LAN.

Management console Administrative Menu:
Universal Serial Console Server
   (A) Allocate a console to a suite.
   (C) Connect to a server console.
   (D) Delete a console allocation.
   (L) List console allocations.
   (M) Monitor an active console.
   (R) Remote customer configuration.
   (U) Utilities.
   (V) View console logs.
   (X) Exit
   Enter Selection:>

Management console 10 "Main Menu" typically utilizes a lettered (or numbered) option selection to access its main functions. Outlined below is a brief description of these functions available from the main menu:

(A) Allocates a server console to an ASCII terminal in a suite. Subsequent screens query the user for a server name from a list of servers, suite and terminal location, and date and time of test completion.

(C) Connects to the chosen servers console from your existing pseudo terminal (i.e. telnet session) from a workstation. When entered from an ASCII terminal in a suite, the selected servers console will be automatically routed to the ASCII terminal upon menu termination. When connecting from a workstation with an X server, a separate window (x-window) will be opened automatically with the selected server's console contained within along with the server name displayed at the top of the window.

(D) De-allocates the selected console allocation whether active, inactive, local, or remote.

(L) Lists all current allocations. User has the option of listing in long format or by suite. When by suite, a rudimentary map of the selected suite is displayed showing any allocations and ASCII terminal availability.

(M) Monitor or view an active server console session in a read only mode.

(R) Remote customer configuration. This includes defining a customer id, allocating consoles to a customer id, configuring a customer IP interface, listing customer configurations, and accessing a customer environment for testing purposes.

(U) The Utilities function presents tools for health checking, problem determination, and failover functions.

(V) View inactive server console logs. Logs for viewing are listed for the selected server indicating creation and last modify time. Future enhancements may include querying for logs based on server, date, suite, customer, or any combination thereof.

(X) Exit menu program.

Remote Connectivity:

Remote connectivity to management console 10 is established via a network interface defined for remote clients 14B-N on management console 10. The NIC is defined with the specified IP address during the first stage of remote client 14B-N's configuration within the menu system. If so required, gateway information can be entered as well. Upon completion of the first server (console) 12A-N allocation, a network patch port number is displayed to the user configuring remote clients 14B-N. That patch port number is then documented on the network Visio for that test and forwarded to a Network team to patch into the associated VLAN. Once the VLAN is established, remote clients 14B-N should then be able to open a telnet session to management console 10 and login with their assigned user id. Upon login to the management console 10, remote clients 14B-N are placed directly into a client menu system such as the following:

Management Console Client Menu Interface:
(USER1)
   A) Access a server.
   D) Disconnect a server.
   L) List status of server.
   M) Monitor an active server.
   X) Exit
   Enter Selection:>

This menu also typically utilizes a lettered (or numbered) option selection to access its main functions. Outlined below is a brief description of these functions available from the client menu.

(A) Access a server will first display a numbered list of "Available" servers 12A-N remote clients 14B-N have been granted access to. The status of "Available" indicates the remote clients 14B-N can connect to that server 12A-N by entering the appropriate line number. Active servers 12A-N are not displayed.

| Server | Status | Hostname |
|---|---|---|
| (1) 6M1A | Available | HostA |
| (2) 6M1B | Available | HostB |

Enter server name or (q)uit:>

(D) Disconnect a server will first display a numbered list of "Connected" servers. Remote clients 14B-N can then choose the server 12A-N to disconnect. Inactive or available servers 12A-N are not displayed.

| Server | Status | Hostname |
|---|---|---|
| (1) 6M1A | Connected | HostA |
| (2) 6M1B | Connected | HostB |

Enter server name or (q)uit:>

(L) List status of servers displays the same information as shown above in both examples.

(M) Monitor or view an active server session in a read-only mode. Server selection is done as in previous examples.

III. Computerized Implementation

Figure 2:
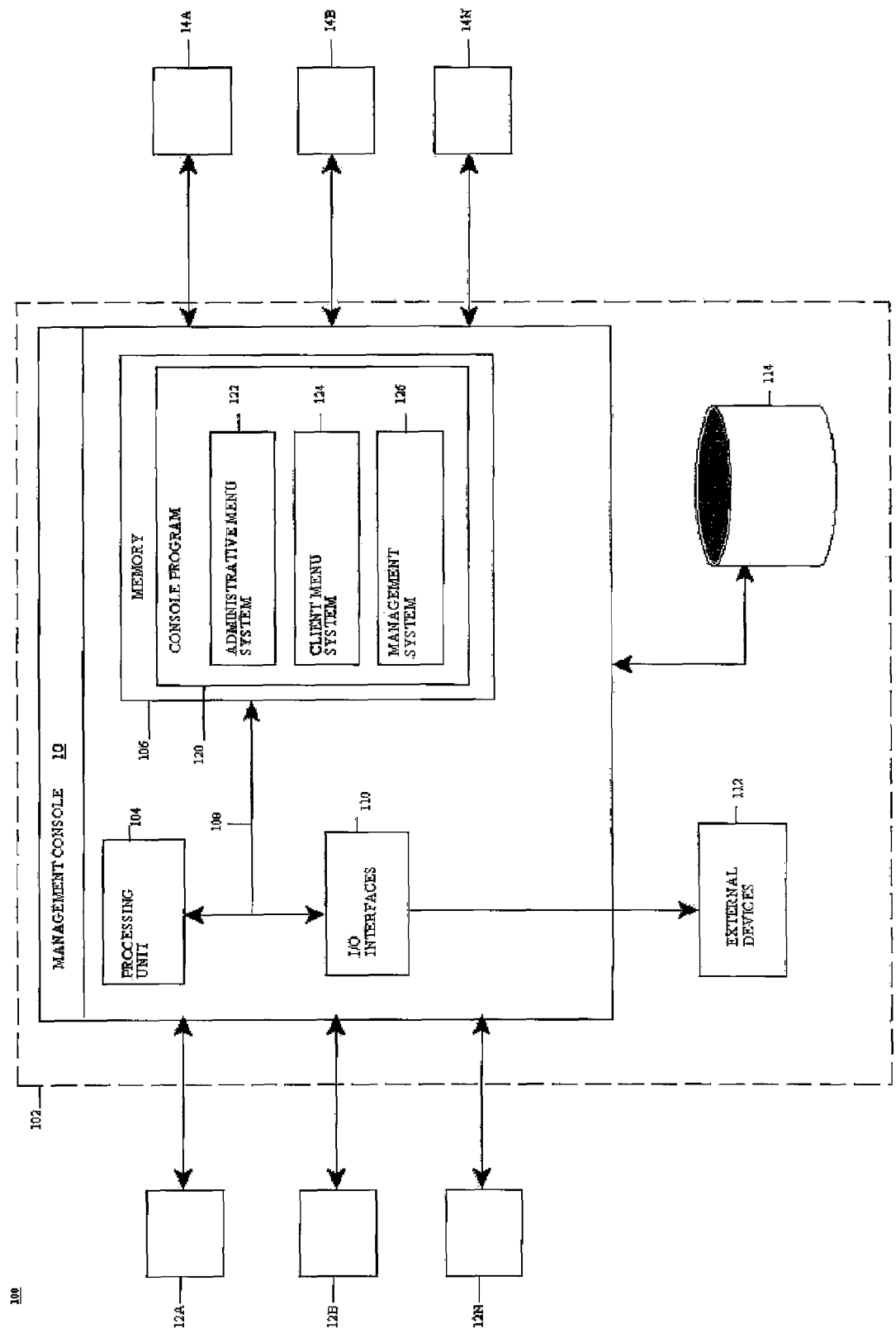
FIG. 2 depicts a more specific computerized implementation according to the present invention.

Referring now to FIG. 2, a system 100 for remotely attesting to a state of a computer system according to the present invention is shown. As depicted, system 100 includes management console 10 deployed within a computer infrastructure/environment 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of system 100 could be deployed, managed, serviced, etc. by a service provider who offers to make programmatically manage client-server connections and/or server configurations according to the present invention.

As shown, management console 10 includes a processing unit 104, a memory 106, a bus 108, and input/output (I/O) interfaces 110. Further, management console 10 is shown in communication with external I/O devices/resources 112 and storage system 114. In general, processing unit 104 executes computer program code, such as console program 120, which is stored in memory 106 and/or storage system 114. While executing computer program code, processing unit 104 can read and/or write data to/from memory 106, storage system 114, and/or I/O interfaces 110. Bus 108 provides a communication link between each of the components in management console 10. External devices 112 can comprise any devices (e.g., keyboard, pointing device, display, etc.) that enable a user to interact with management console 10 and/or any devices (e.g., network card, modem, etc.) that enable management console 10 to communicate with one or more other devices.

Computer infrastructure 102 is only illustrative of various types of computer infrastructures for implementing the invention. For example, in one embodiment, computer infrastructure 102 comprises two or more devices (e.g., a server cluster) that communicate over a network to perform the various process steps of the invention. Moreover, management console 10 is only representative of various possible computer systems that can include numerous combinations of hardware. To this extent, in other embodiments, management console 10 can comprise any specific purpose providing article of manufacture comprising hardware and/or computer program code for performing specific functions, any providing article of manufacture that comprises a combination of specific purpose and general purpose hardware/software, or the like. In each case, the program code and hardware can be created using standard programming and engineering techniques, respectively. Moreover, processing unit 104 may comprise a single processing unit, or be distributed across one or more processing units in one or more locations, e.g., on a client and server. Similarly, memory 106 and/or storage system 114 can comprise any combination of various types of data storage and/or transmission media that reside at one or more physical locations. Further, I/O interfaces 110 can comprise any system for exchanging information with one or more external devices 24. Still further, it is understood that one or more additional components (e.g., system software, math co-processing unit, etc.) not shown in FIG. 2 can be included in management console 10. However, if management console 10 comprises a handheld device or the like, it is understood that one or more external devices 112 (e.g., a display) and/or storage system 114 could be contained within management console 10, not externally as shown.

Storage system 114 can be any type of system (e.g., a database) capable of providing storage for information under the present invention. To this extent, storage system 114 could include one or more storage devices, such as a magnetic disk drive or an optical disk drive. In another embodiment, storage system 114 includes data distributed across, for example, a local area network (LAN), wide area network (WAN) or a storage area network (SAN) (not shown). It should be understood that although not shown, servers 12A-N and clients 14A-N typically include computerized components similar to management console 10. It should also be understood that although not shown, additional components, such as cache memory, communication systems, system software layers (e.g., BIOS, Boot, etc.) may be incorporated into management console 10, servers 12A-N, and/or clients 14A-N.

Shown in memory 106 of management console 10 is console program 120, which includes administrative menu system 122, client menu system 124, and management system 126. In general, console program 120 provides the functionality of the present invention (e.g., as discussed above as the "software" for management console) as will be further discussed below. It should be appreciated that the same functionality could be implemented with a different configuration of systems and/or sub-systems than is shown in FIG. 2. This depiction is intended to be illustrative only.

In any event, administrative menu system 122 provides the administrative menu (shown and described above) for managing configurations of servers 12A-N on management console 10 through which the connections with clients 14A-N are established. Along these lines, the administrative menu comprises a list of possible administrative selections displayed in an interface on management console 10 from which an administrator (not shown) can make one or more selections. Client menu system 124 provides the client menu (shown and described above) for managing the connections between servers 12A-N and clients 14A-N. The client menu includes a list of possible client selections displayed in an interface (e.g., WEB browser) on each of clients 14A-N from which end-users (not shown) can make one or more selections. Management system 126 will programmatically manage the connections and the configurations based on selections made (e.g., by end-users and/or management console 10 administrators) using the client menu and the administrative menu. To this extent management system 126 can automatically edit a set of files (e.g., as shown above) based on the selections made using the client menu and the administrative menu. Previously, editing these files to manage the client-server connections and server configurations required a manual editing of these files. Console program 120 (e.g., via management system 126) can also perform other functions discussed above such as logging results, selections, or the like.

While shown and described herein as a method and system for programmatically managing connections between servers and clients, it is understood that the invention further provides various alternative embodiments. For example, in one embodiment, the invention provides a computer-readable/useable medium that includes computer program code to enable a computer infrastructure to programmatically manage connections between servers and clients. To this extent, the computer-readable/useable medium includes program code that implements the process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a providing device, such as memory 106 (FIG. 2) and/or storage system 114 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to programmatically manage connections between servers and clients. In this case, the service provider can create, maintain, support, etc., a computer infrastructure, such as computer infrastructure 102 (FIG. 2) that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for programmatically managing connections between servers and clients. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of (1) installing program code on a providing device, such as management console 10 (FIG. 2), from a computer-readable medium; (2) adding one or more devices to the computer infrastructure; and (3) incorporating and/or modifying one or more existing systems of the computer infrastructure to enable the computer infrastructure to perform the process steps of the invention.

As used herein, it is understood that the terms program code" and "computer program code" are synonymous and mean any expression, in any language, code or notation, of a set of instructions intended to cause a providing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A programmatic management system, comprising:
at least one processor, comprising;
a client menu system, comprising a list of possible client selections, for providing a client menu that enables a client to manage connections between servers and the client, the connections management including selecting a server by the client for connection from among a plurality of allocated consoles, the connections being console connections in a serial/IP infrastructure environment which is a static isolated network environment;
an administrative menu system, comprising a list of possible administrative selections, for providing an administrative menu that enables an administrator to manage configurations of the servers on a management console through which the connections with clients to consoles of the servers are established, the managing including allocating the server to the client for console connection, the serial/IP infrastructure being accessible only via the management console; and
a management system for programmatically managing the connections and the configurations based on selections made using the client menu and the administrative menu, the programmatically managing including the management console establishing a console connection between the client and the selected server using software that simulates a direct serial connection, wherein the management system automatically edits a set of files based on the selections made using the client menu and the administrative menu and wherein the management console automatically configures network interfaces.

2. The system of claim 1, wherein the servers comprise open system servers.

3. The system of claim 1, wherein the clients can comprise both clients that are local to the management console and clients that are remote from the management console.

4. The system of claim 1, wherein the client menu comprises a list of possible client selections displayed in an interface on each of the clients.

5. The system of claim 4, wherein the interfaces comprise browser-based interfaces.

6. The system of claim 1, wherein the administrative menu comprises a list of possible administrative selections displayed in an interface on the management console.

7. The system of claim 1, wherein the client menu system, the administrative menu system, and the management system reside on the management console.

8. A programmatic management method, comprising:
providing a client menu, comprising a list of possible client selections, that enables a client to manage connections between servers and the client, the connections management including selecting a server by the client for connection from among a plurality of allocated consoles, the connections being console connections in a serial/IP infrastructure environment which is a static isolated network environment;
providing an administrative menu, comprising a list of possible administrative selections, that enables an administrator to manage configurations of the servers on a management console through which the connections to consoles of the servers are established, the managing including allocating the server to the client for console connection, the serial/IP infrastructure being accessible only via the management console; and
programmatically managing the connections and the configurations based on selections made using the client menu and the administrative menu, the programmatically managing including the management console establishing a console connection between the client and the selected server using software that simulates a direct serial connection, wherein the programmatically managing the connections and configurations comprises automatically editing a set of files based on the selections made using the client menu and the administrative menu and wherein the management console automatically configures network interfaces.

9. The method of claim 8, wherein the servers comprise open system servers.

10. The method of claim 8, wherein the clients can comprise both clients that are local to the management console and clients that are remote from the management console.

11. The method of claim 8, wherein the client menu comprises a list of possible client selections displayed in an interface on each of the clients.

12. The method of claim 11, wherein the interfaces comprise browser-based interfaces.

13. The method of claim 8, wherein the administrative menu comprises a list of possible selections displayed in an interface on the management console.

14. A method for programmatically managing connections between clients and servers, comprising:
providing a client menu comprising a list of possible client selections to the clients from a management console through which the connections are established by selecting a server by the client for connection from among a plurality of allocated consoles, the connections being console connections in a serial/IP infrastructure environment which is a static isolated network environment;
receiving a client selection made from the list of possible client selections on the management console from one of the clients, the managing including allocating the server to the client for console connection, the serial/IP infrastructure being accessible only via the management console; and
programmatically managing a connection between the client and one of the servers to a console of the one of the servers based on the client selection, the programmatically managing including the management console establishing a console connection between the client and the selected server using software that simulates a direct serial connection, wherein the programmatically managing the connections and configurations comprises automatically editing a set of files based on the selections made using the client menu and on the management console and wherein the management console automatically configures network interfaces.

15. The method of claim 14, further comprising:
providing an administrative menu comprising a list of possible administrative selections on the management console;
receiving an administrative selection made from the list of possible administrative selections; and
programmatically managing a configuration of one of the servers based on the administrative selection.

16. The method of claim 15, wherein the programmatically managing the connection and the programmatically managing the configuration comprises automatically editing a set of files based on the client selection and the administrative selection.

17. The method of claim 14, client menu being provided in an interface on each of clients, and the administrative menu being provided in an interface on the management console.

18. A program product stored on a non-transitory computer readable medium for programmatically managing connections between servers and clients, the computer readable medium comprising program code for causing a computer system to perform the following:
provide a client menu, comprising a list of possible client selections, that enables a client to manage the connections to the clients, the connections management including selecting a server by the client for connection from among a plurality of allocated consoles, the connections being console connections in a serial/IP infrastructure environment which is a static isolated network environment;
provide an administrative menu, comprising a list of possible administrative selections, that enables an administrator to manage configurations of the servers on a management console through which the connections are established to consoles of the servers, the managing including allocating the server to the client for console connection, the serial/IP infrastructure being accessible only via the management console; and
programmatically manage the connections and the configurations based on selections made using the client menu and the administrative menu, the programmatically managing including the management console establishing a console connection between the client and the selected server using software that simulates a direct serial connection, wherein program code for causing the computer system to programmatically manage the connections and configurations comprises program code for causing the computer system to automatically edit a set of files based on the selections made using the client menu and the administrative menu and wherein the management console automatically configures network interfaces.

19. The program product of claim 18, wherein the servers comprise open system servers.

20. The program product of claim 18, wherein the clients can comprise both clients that are local to the management console and clients that are remote from the management console.

21. The program product of claim 18, wherein the client menu comprises a list of possible client selections displayed in an interface on each of the clients.

22. The program product of claim 21, wherein the interfaces comprise browser-based interfaces.

23. The program product of claim 18, wherein the administrative menu comprises a list of possible selections displayed in an interface on the management console.

24. A method for deploying a system for programmatically managing connections between servers and clients, comprising:
providing a computer infrastructure being operable to:
provide a client menu, comprising a list of possible client selections, that enables a client to manage the connections to the clients, the connections management including selecting a server by the client for connection from among a plurality of allocated consoles, the connections being console connections in a serial/IP infrastructure environment which is a static isolated network environment;
provide an administrative menu, comprising a list of possible administrative selections, that enables an administrator to manage configurations of the servers on a management console through which the connections are established to consoles of the servers, the managing including allocating the server to the client for console connection, the serial/IP infrastructure being accessible only via the management console; and programmatically manage the connections and the configurations based on selections made using the client menu and the administrative menu, the programmatically managing including the management console establishing a console connection between the client and the selected server using software that simulates a direct serial connection, wherein the programmatically managing the connections and configurations comprises automatically editing a set of files based on the selections made using the client menu and the administrative menu and wherein the management console automatically configures network interfaces.

* * * * *